United States Patent
An et al.

(10) Patent No.: US 9,963,117 B2
(45) Date of Patent: May 8, 2018

(54) FLAT WIPER BLADE ASSEMBLY

(71) Applicant: KBWS Corporation, Daegu (KR)

(72) Inventors: Jae-Hyuck An, Daegu (KR); Jin-Wan Park, Daegu (KR)

(73) Assignee: KBWS Corporation, Daegu (KR)

( * ) Notice: Subject to any disclaimer, the term of this patent is extended or adjusted under 35 U.S.C. 154(b) by 601 days.

(21) Appl. No.: 14/461,036

(22) Filed: Aug. 15, 2014

(65) Prior Publication Data
US 2015/0074935 A1 Mar. 19, 2015

(30) Foreign Application Priority Data
Sep. 16, 2013 (KR) .......................... 10-2013-0110835

(51) Int. Cl.
*B60S 1/40* (2006.01)
*B60S 1/38* (2006.01)

(52) U.S. Cl.
CPC ........... *B60S 1/4083* (2013.01); *B60S 1/4016* (2013.01); *B60S 1/3849* (2013.01); *B60S 1/3851* (2013.01);
(Continued)

(58) Field of Classification Search
CPC .... B60S 1/3853; B60S 1/3851; B60S 1/3858; B60S 1/4003; B60S 1/3863; B60S 1/3865;
(Continued)

(56) References Cited

U.S. PATENT DOCUMENTS 8,973,207 B2    3/2015  Depondt
2009/0199357 A1*  8/2009  Thienard ............... B60S 1/3853
                                              15/250.32
(Continued)

FOREIGN PATENT DOCUMENTS

DE    102009029469 A1   3/2011
KR       101036579 B1   5/2011
(Continued)

OTHER PUBLICATIONS

Office Action for German Patent Application No. DE 102014113331.5, dated Oct. 8, 2015, 4 Pages (With Concise Explanation of Relevance).
(Continued)

*Primary Examiner* — Gary Graham
(74) *Attorney, Agent, or Firm* — Fenwick & West LLP

(57) ABSTRACT

A flat wiper blade assembly may be provided that includes: a wiper strip 10 which wipes a wiping surface; a guide spring 30 which supports the wiper strip 10; a first spoiler 41 and a second spoiler 42 which are coupled to the guide spring 30; a seating part 100 which is coupled to the guide spring 30 in an attachable and removable manner; and an adaptor 200 and 200' which is coupled to the seating part 100. The seating part 100 includes a first fitting portion 110 formed on one end thereof and a first catching portion 120 formed on the other end thereof. The adaptor 200 and 200' includes a second fitting portion 210 and 210' which is formed on one end thereof and coupled to the first fitting portion 110 and includes a second catching portion 220 and 220' which is formed on the other end thereof and coupled to the first catching portion 120.

5 Claims, 13 Drawing Sheets

(52) U.S. Cl.
CPC ........ *B60S 1/3858* (2013.01); *Y10T 29/49826* (2015.01)

(58) Field of Classification Search
CPC ................. B60S 1/3867; B60S 1/3868; B60S 2001/3815; B60S 1/3874; B60S 1/3849
USPC ...................................................... 15/250.32
See application file for complete search history.

(56) References Cited

U.S. PATENT DOCUMENTS

| | | | | |
|---|---|---|---|---|
| 2011/0277264 | A1* | 11/2011 | Ehde ..................... | B60S 1/3863 15/250.32 |
| 2012/0180247 | A1* | 7/2012 | Ku ........................ | B60S 1/3853 15/250.32 |
| 2013/0192016 | A1* | 8/2013 | Kim ...................... | B60S 1/3858 15/250.201 |

FOREIGN PATENT DOCUMENTS

| | | |
|---|---|---|
| KR | 10-1201547 B1 | 11/2012 |
| KR | 10-2007-0105977 A | 6/2013 |
| WO | WO 2013/089312 A1 | 6/2013 |

OTHER PUBLICATIONS

Office Action for Chinese Patent Application No. CN 201410327985.9, dated Mar. 2, 2016, 7 Pages. (With Concise Explanation of Relevance).
Korean Intellectual Property Office, Office Action, Korean Patent Application No. 10-2013-0110835, dated Sep. 19, 2014, five pages [with concise explanation of relevance in English].

\* cited by examiner

FLAT WIPER BLADE ASSEMBLY

CROSS-REFERENCE TO RELATED APPLICATION

This application claims priority under 35 U.S.C. § 119(e) to Korean Patent Application No. 10-2013-0110835 filed on Sep. 16, 2013, which is incorporated by reference herein in its entirety.

BACKGROUND

Field

The present invention relates to a flat wiper blade assembly and a coupling method thereof.

Description of Related Art

In general, a wiper blade removes impurities, snow, rain or the like when driving and prevents a driver's front sight from being deteriorated. As a motor drives a link apparatus connected to a wiper arm, the wiper blade performs a repetitive reciprocating action in a fan shape.

The wiper blade includes a long wiper strip in contact with a glass surface and a guide spring which maintains and supports the wiper strip in a longitudinal direction of the wiper strip. The wiper blade including the guide spring is known as a "conventional" wiper blade in the art. Recently, a wiper blade is being employed which makes use of one guide spring curved at a predetermined curvature and formed in the form of a long thin bar. Such a wiper blade is known as a flat wiper blade or a flat-bar wiper blade in the art.

As compared with the "conventional" wiper blade, the flat wiper blade has a less height and receives less air resistance. With a uniform load, the flat wiper blade is also able to cause the wiper strip to contact with the glass surface. A flat wiper blade assembly including the flat wiper blade includes an adaptor disposed in the central portion of the guide spring. The flat wiper blade assembly is connected to a wiper arm such that the adaptor is separably connected to the end portion of the wiper arm.

The existing wiper arm for the vehicle, that is, the conventional driving arm for the vehicle is largely classified into a "U" shaped clip type having a catching structure, a bayonet type fitted as a plug type, a pin type forming a protrusion in a side portion and taking a fitting structure by the protrusion, a side hole type performing a fitting coupling in a side portion of a wiper apparatus, developed by a Bosch corporation, and a top-lock type performing a coupling by a structure covering the upper portion of the wiper apparatus, and the various types of driving arms have a limitation in that they can use only dedicated wiper apparatuses since their shapes and sizes are different from other.

Accordingly, product standardization for the wiper apparatus is difficult to achieve, thus the flexibility of product design is reduced. Moreover, since wiper blades which correspond to a variety of the wiper arms respectively should be manufactured, the time and cost required for manufacturing the wiper blades are increased.

SUMMARY

One embodiment is a flat wiper blade assembly that includes: a wiper strip 10 which wipes a wiping surface; a guide spring 30 which supports the wiper strip 10; a first spoiler 41 and a second spoiler 42 which are coupled to the guide spring 30; a seating part 100 which is coupled to the guide spring 30 in an attachable and removable manner; and an adaptor 200 and 200' which is coupled to the seating part 100. The seating part 100 includes a first fitting portion 110 formed on one end thereof and a first catching portion 120 formed on the other end thereof. The adaptor 200 and 200' includes a second fitting portion 210 and 210' which is formed on one end thereof and coupled to the first fitting portion 110 and includes a second catching portion 220 and 220' which is formed on the other end thereof and coupled to the first catching portion 120.

The first catching portion 120 may include a switch 123, and the second catching portion 220 and 220' may include a contact surface "b". The first catching portion 120 may further include a contact surface "a" located on the contact surface "b".

The first catching portion 120 and the second catching portion 220 may be elastically caught and coupled to each other.

The second catching portion 220 and 220' may include a switch 223, and the second catching portion 220 and 220' may further include a contact surface "b". The first catching portion 120 may include a contact surface "a" located on the contact surface "b".

The first catching portion 120 and the second catching portion 220 may be elastically caught and coupled to each other.

The first fitting portion 110 may include a fitting recess 112, and the second fitting portion 210 may include a fitting protrusion 211. The fitting protrusion 211 may be inserted into the fitting recess 112.

The first fitting portion 110 may include a fitting protrusion, and the second fitting portion 210 may include a fitting recess. The fitting protrusion may be inserted into the fitting recess.

The seating part 100 may further include a catching portion 135, and the adaptor 200 and 200' may be located on the catching portion 135 such that the catching portion 135 is not lifted up.

Another embodiment is a method for coupling a seating part 100 to an adaptor 200 and 200' of a flat wiper blade assembly. The method includes: coupling a second fitting portion 210 of the adaptor 200 and 200' to a first fitting portion 110 of the seating part 100; and coupling a second catching portion 220 of the adaptor 200 and 200' to a first catching portion 120 of the seating part 100.

The coupling a second catching portion 220 of the adaptor 200 and 200' to the first catching portion 120 of the seating part 100 may be causing a contact surface "a" of the first catching portion 120 to contact on a contact surface "b" of the adaptor 200 and 200'.

The coupling the second fitting portion 210 of the adaptor 200 and 200' to the first fitting portion 110 of the seating part 100 may be inserting and fixing a fitting protrusion 211 of the second fitting portion 210 into a fitting recess 112 of the first fitting portion 110.

The coupling the second fitting portion 210 of the adaptor 200 and 200' to the first fitting portion 110 of the seating part 100 may be inserting and fixing a fitting protrusion of the first fitting portion 110 into a fitting recess of the second fitting portion 210.

DETAILED DESCRIPTION

An embodiment of the present invention will be described in detail with reference to the accompanying drawings. In the components of the present invention, detailed descriptions of what can be clearly understood and easily carried into practice through a prior art by those skilled in the art will be omitted to avoid making the subject matter of the present invention unclear.

First Embodiment

Hereafter, the overall structure of a flat wiper blade assembly 1 according to a first embodiment will be described.

Figure 1:
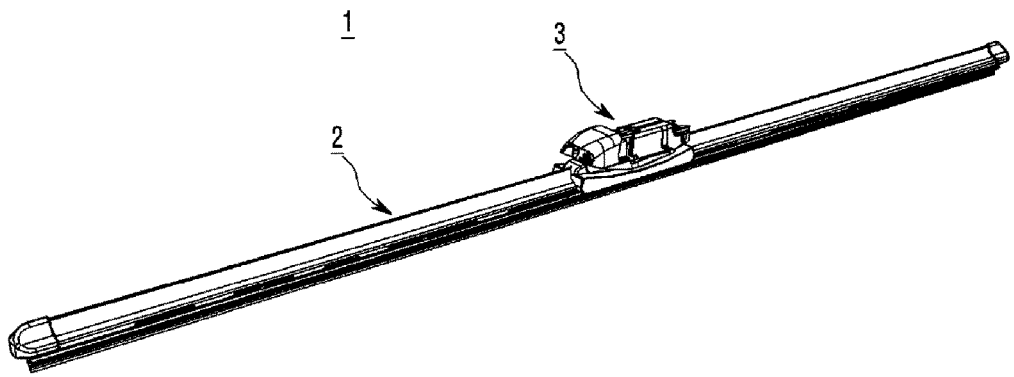
FIG. 1 is a perspective view showing an overall structure of a flat wiper blade assembly according to a first embodiment.
Figure 2:
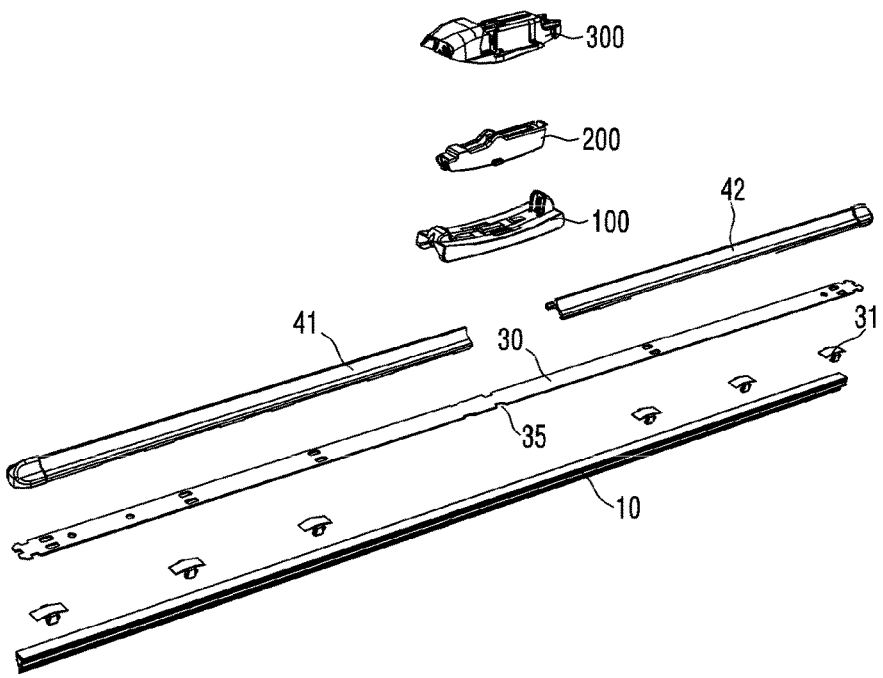
FIG. 2 is an exploded perspective view showing that the flat wiper blade assembly of FIG. 1 has been disassembled.

FIG. 1 is a perspective view showing an overall structure of a flat wiper blade assembly according to a first embodiment. FIG. 2 is an exploded perspective view showing that the flat wiper blade assembly of FIG. 1 has been disassembled.

Referring to FIGS. 1 and 2, the flat wiper blade assembly 1 according to the first embodiment includes a flat wiper blade 2 contacting closely with the glass surface of a vehicle and includes an adaptor part 3 assembled to the central portion of the flat wiper blade 2 so as to connect the flat wiper blade 2 to a wiper arm (not shown).

Hereafter, the flat wiper blade 2 will be described in detail.

Referring to FIGS. 1 and 2, the flat wiper blade 2 includes the flat wiper blade 2 includes a wiper strip 10 which contacts closely with and wipes the glass surface of the vehicle, a guide spring 30 which is disposed on the wiper strip 10, supports the wiper strip 10 and has a catching recess 35 formed therein into which a below-described seating part 100 is inserted and fixed, and a first spoiler 41 and a second spoiler 42 which are coupled to the guide spring 30, and a seating part 100 for coupling the adaptor part 3 to the guide spring 30.

The flat wiper blade 2 is connected to the front end of the wiper arm and receives a pressing force from the wiper arm with respect to the glass surface of the vehicle. The wiper arm rotates reciprocatively at a predetermined angle by a wiper motor (not shown). Accordingly, the flat wiper blade 2 wipes the glass surface (wiping surface) of the vehicle within the predetermined angle.

Here, recesses may be formed in the guide spring 30 at a predetermined interval, so that a fastener 31 can be inserted and fixed into the recess from the top surface to the bottom surface of the guide spring 30. However, the separate fastener 31 is not necessarily inserted and fixed into the recess. The fastener 31 may be integrally formed with the guide spring 30. Also, the recess may not be formed in the guide spring 30. In this case, the wiper strip 10 may be coupled to the fastener 31 after inserting and fixing the guide spring 30 into the recess formed in the side of the fastener 31, or the guide spring 30 and the wiper strip 10 may be directly coupled to each other without the separate fastener 31, or the guide spring 30 and the wiper strip 10 may be coupled to each other by the first and second spoiler 41 and 42.

Figure 3A:
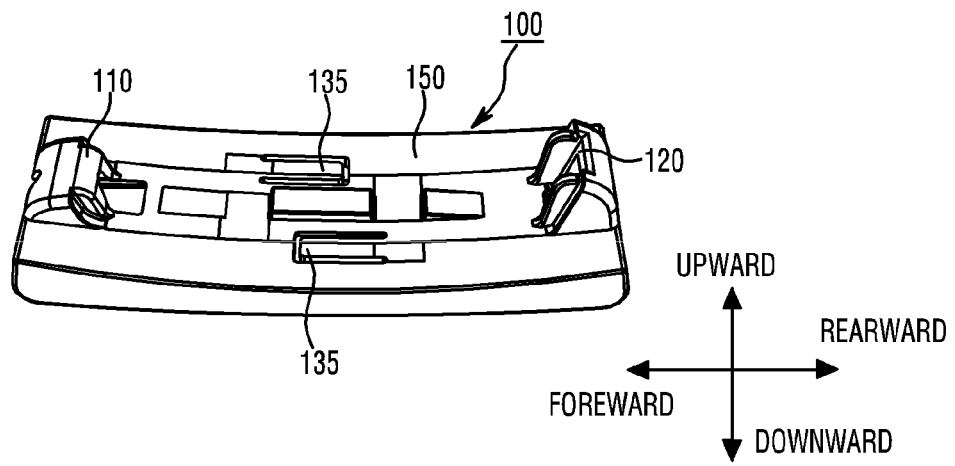
FIGS. 3a to 3c are perspective views of a seating part shown in FIG. 2.
Figure 3B:
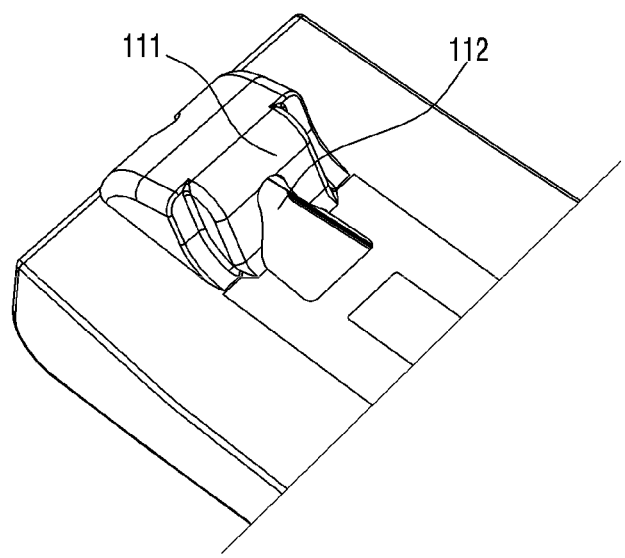
Figure 3C:
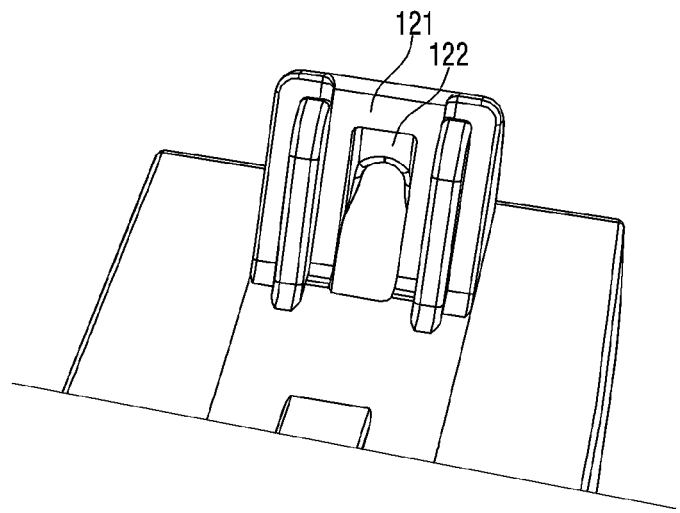

FIGS. 3a to 3c are perspective views of the seating part shown in FIG. 2. Specifically, FIG. 3a is an overall perspective view of the seating part 100. FIG. 3b is a partial perspective view specifically showing one end of the seating part 100. FIG. 3c is a partial perspective view specifically showing the other end of the seating part 100.

Referring to FIGS. 2 and 3a to 3c, the seating part 100 is coupled by the catching recess 35 of the guide spring 30. The seating part 100 includes a first fitting portion 110 and a first catching portion 120 such that the seating part 100 is attachable to and removable from a below-described adaptor 200. Further, the seating part 100 may further include catching portions 135 formed separately from each other.

The first fitting portion 110 may be formed on one side of a top surface 150 of the seating part 100. The first fitting portion 110 may include a rear surface 111 and a fitting recess 112 formed in the front of the rear surface 111. The fitting recess 112 may have a shape capable for receiving a below-described fitting protrusion 211 of a second fitting portion 210 of the adaptor 200.

The first catching portion 120 may be formed on the other side of the top surface 150 of the seating part 100. The first catching portion 120 may include a front surface 121 and a catching recess 122 formed in the back of the front surface 121. The catching recess 122 may have a shape capable of receiving a below-described catching protrusion 224 of the adaptor 200.

Here, the foregoing has described that the fitting recess 112 is formed in the first fitting portion 110 and the fitting protrusion 211 is formed on the second fitting portion 210, so that the fitting protrusion 211 is inserted into the fitting recess 112. However, the present invention is not necessarily limited to this. The fitting protrusion is formed on the first fitting portion 110 and the fitting recess is formed in the second fitting portion 210, so that the fitting protrusion may be inserted into the fitting recess.

The catching portion 135 is caught by the catching recess 35 formed in the guide spring 30, so that the guide spring 30 cannot move in the longitudinal direction thereof. Here, under the state where the seating part 100 is coupled to the guide spring 30 by catching the catching portion 135 into the catching recess 35, when the catching portion 135 is lifted up, the seating part 100 and guide spring 30, which have been coupled to each other, may be separated from each other. Therefore, it is desirable that the catching portion 135 is not moved upward under the state where the seating part 100 has been coupled to the guide spring 30.

Hereafter, the adaptor part 3 will be described in detail.

Figure 4:
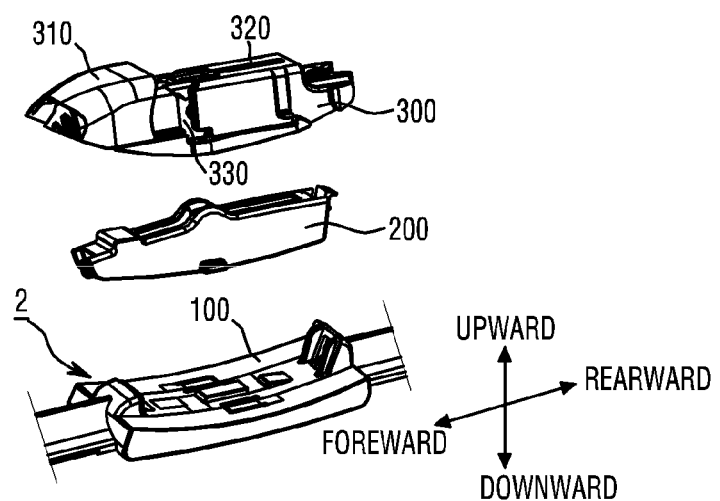
FIG. 4 shows that a flat wiper blade, an adaptor and a connector of the flat wiper blade assembly according to the first embodiment have been disassembled.

FIG. 4 shows that the flat wiper blade, the adaptor part and a connector of the flat wiper blade assembly according to the first embodiment have been disassembled.

Referring to FIG. 4, the adaptor part 3 includes the adaptor 200 and a connector 300. The adaptor 200 is coupled to the seating part 100 in an attachable and removable manner. The connector 300 is coupled to the adaptor 200 and couples the wiper arm to the flat wiper blade 2.

In the present invention, the adaptor part 3 is formed by coupling the adaptor 200 and the connector 300 as separate components. However, there is no limit to this. The adaptor part 3 may be formed by integrally configuring the adaptor 200 and the connector 300 in the form of one component.

Figure 5A:
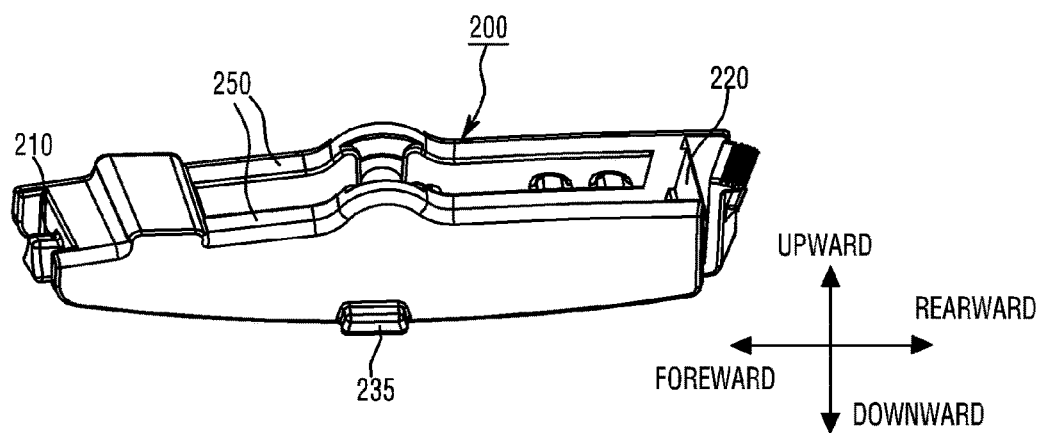
FIGS. 5a to 5d are perspective views of the adaptor shown in FIG. 4.
Figure 5B:
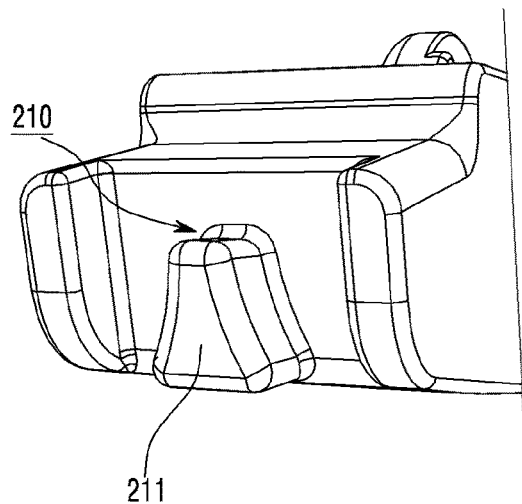
Figure 5C:
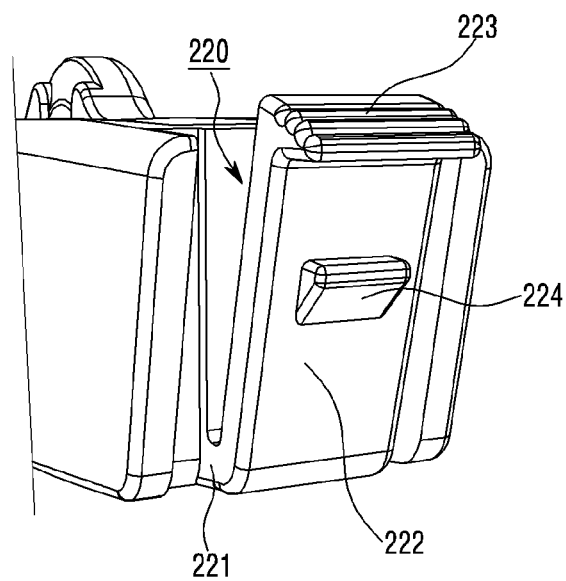
Figure 5D:
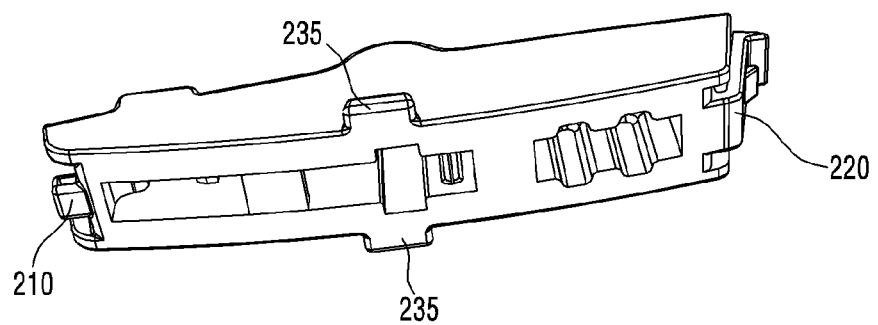

FIGS. 5a to 5d are perspective views of the adaptor shown in FIG. 4. Specifically, FIG. 5a is an overall perspective view showing the top surface of the adaptor 200. FIG. 5b is a partial perspective view showing one end of the adaptor 200. FIG. 5c is partial perspective view showing the other end of the adaptor 200. FIG. 5d is an overall perspective view showing the bottom surface of the adaptor 200.

Referring to FIGS. 4 and 5a to 5d, the adaptor 200 includes a second fitting portion 210 formed on one end of the adaptor 200, a second catching portion 220 formed on the other end of the adaptor 200, and a pair of pressing portions 235 formed separately from each other on both sides of the adaptor 200.

The second fitting portion 210 may include the fitting protrusion 211 formed forwardly on the end of the adaptor 200. The fitting protrusion 211 may have a shape which can be inserted into the fitting recess 112 of the first fitting portion 110.

The second catching portion 220 may include an extension part 221 which is formed on the other end of the adaptor 200 in the rearward direction of the adaptor 200, a body 222 which is formed on the end of the extension part 221 and extends upward, a switch 223 which is formed at the end of the body 222, and a catching protrusion 224 which protrudes from the body 222 toward the rear of the second catching portion 220.

The body 222 may be formed to have an elastic force in a reverse direction to an external force generated in the longitudinal direction of the adaptor 200.

Since the switch 223 is formed to protrude outwardly from the adaptor 200, the switch 223 can be operated without separate tools. Moreover, a person with big fingers is able to easily operate the switch 223.

The catching protrusion 224 may have a shape which can be inserted into the first catching portion 120 of the seating part 100 shown in FIG. 3.

Meanwhile, a pair of guide plates 250 may be formed separately from each other at a predetermined interval and protrude vertically upward from the top of the adaptor 200. The guide plate 250 may be inserted and fixed into the connector 300 to be described below.

Meanwhile, referring to FIG. 4, the connector 300 includes a body part 320 and a cover 310. The body part 320 includes at least one catching portion 330 which catches the wiper arm and is formed on both sides of the connector 300. The cover 310 fixes the wiper arm or releases the fixed wiper arm.

The wiper arm which has a top-lock type, an M-lock type, etc., which perform a coupling by a structure covering the upper portion of a wiper apparatus may be used in the connector 300.

Hereafter, how the flat wiper blade 2 and the adaptor part 3 are coupled to each other will be sequentially described.

FIGS. 6a to 6d are views for describing how the seating part shown in FIG. 3 is coupled to the adaptor shown in FIG. 5. FIGS. 7a to 7c are views for describing how the first catching portion shown in FIG. 3 is coupled to the second catching portion shown in FIG. 5.

Figure 6A:
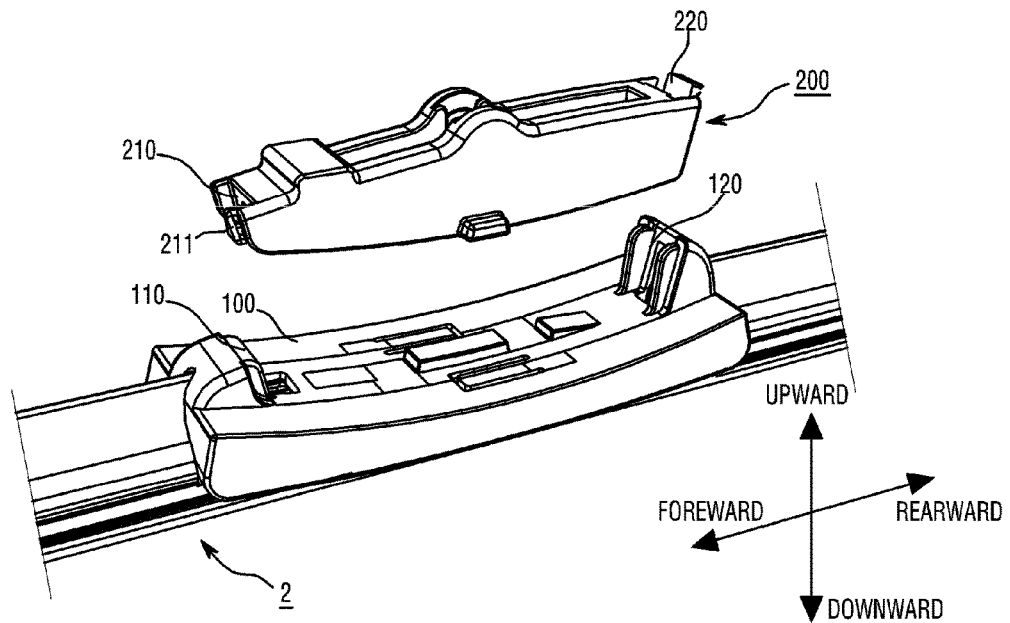
FIGS. 6a to 6d are views for describing how the seating part shown in FIG. 3 is coupled to the adaptor shown in FIG. 5.
Figure 7A:
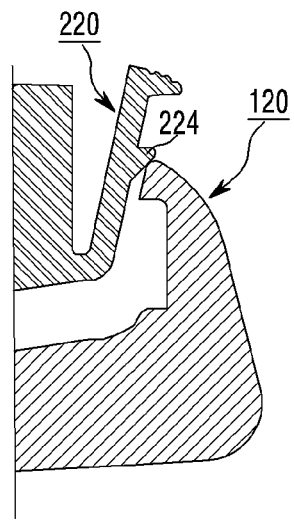
FIGS. 7a to 7c are views for describing how a first catching portion shown in FIG. 3 is coupled to a second catching portion shown in FIG. 5.
Figure 7B:
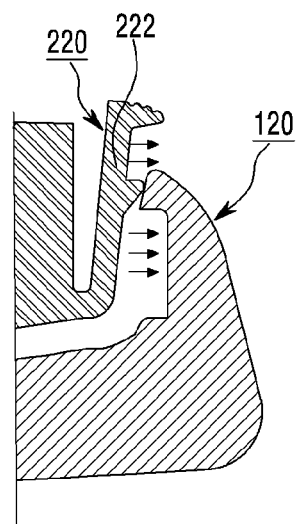
Figure 7C:
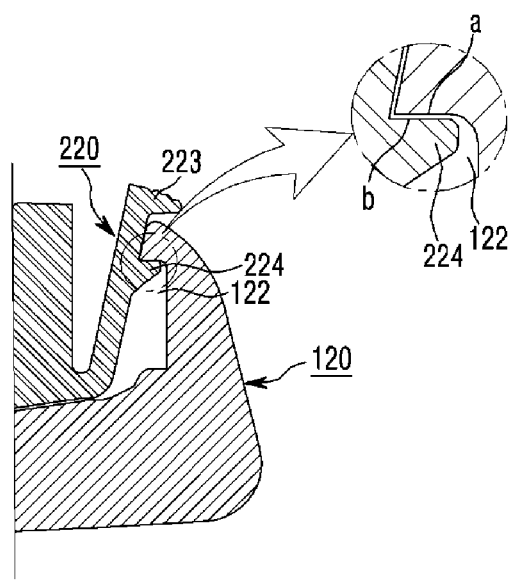

Specifically, FIG. 6a is a perspective view showing a state before the seating part 100 is coupled to the adaptor 200.

Referring to FIG. 6a, the adaptor 200 is disposed such that the second fitting portion 210 of the adaptor 200 is located above the first fitting portion 110 of the seating part 100 and the second catching portion 220 of the adaptor 200 is located above the first catching portion 120 of the seating part 100.

Figure 6B:
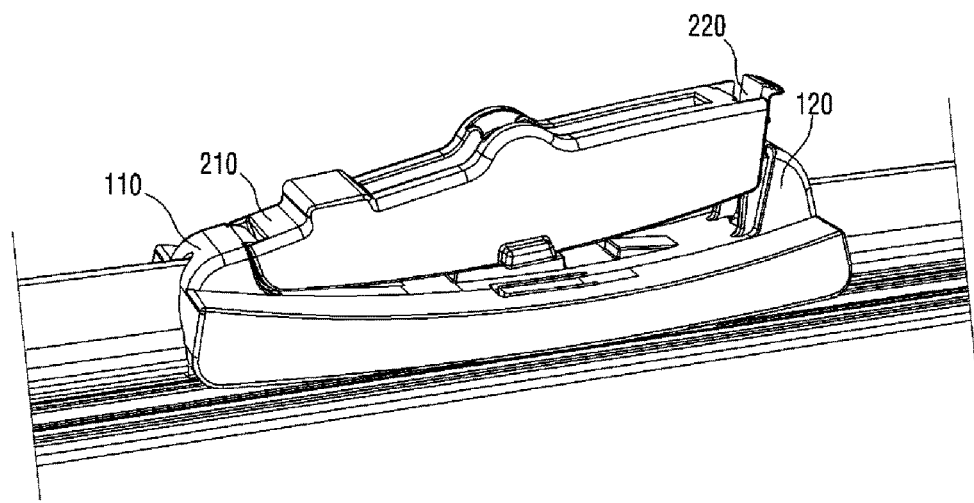

FIG. 6b is a perspective view showing that the second fitting portion 210 of the adaptor 200 has been inserted into the first fitting portion 110 of the seating part 100.

Referring to FIG. 6b, after the adaptor 200 is inclined at a predetermined angle such that the second fitting portion 210 is located lower than the second catching portion 220 in order that the second fitting portion 210 of the adaptor 200 is inserted into the first fitting portion 110 of the seating part 100. Then, the second fitting portion 210 is inserted into the fitting recess 112 toward the front from the rear of the seating part 100.

Figure 6C:
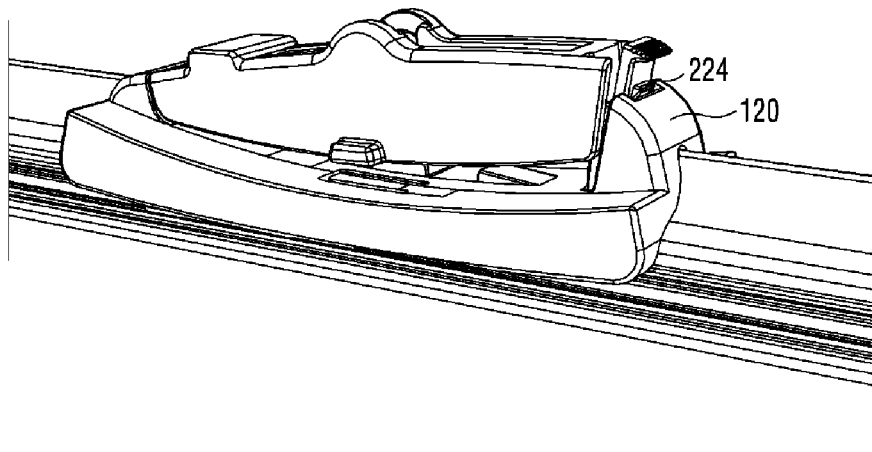

FIGS. 6c and 7a are a perspective view and a cross sectional view respectively which show that the catching protrusion 224 of the adaptor 200 has been caught by the upper portion of the first catching portion 120 of the seating part 100.

Referring to FIGS. 6c and 7a, the other end of the adaptor 200 is pressed downward. In this case, the catching protrusion 224 of the second catching portion 220 is caught by the upper portion of the first catching portion 120.

FIG. 7b is a cross sectional view showing a state where the elastic force has been generated in the body 222.

Referring to FIG. 7b, the other end of the adaptor 200 is more pressed downward, the body 222 of the second catching portion 220 gets closer to the other end of the adaptor 200 and the elastic force is generated in the direction farther away from the other end of the adaptor 200 (arrow direction).

Figure 6D:
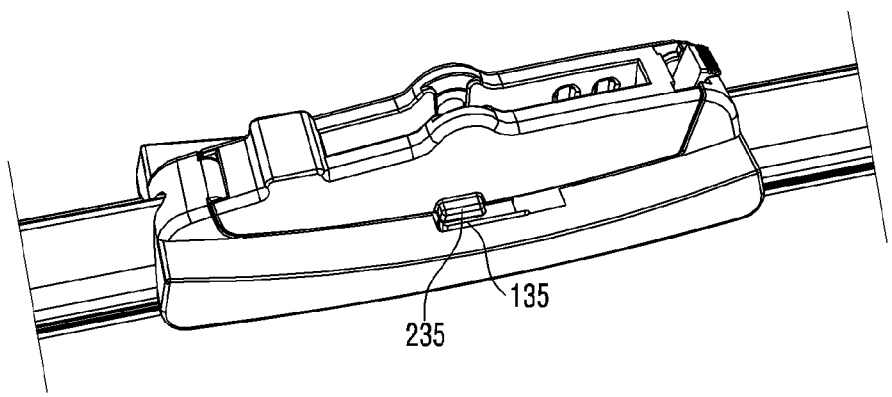

FIGS. 6d and 7c are a perspective view and a cross sectional view respectively which show that the seating part 100 has been coupled to the adaptor 200.

Referring to FIGS. 6d and 7c, when the other end of the adaptor 200 is more pressed downward, the catching protrusion 224 of the second catching portion 220 is inserted and fixed into the catching recess 122 of the first catching portion 120, and thus, the seating part 100 and the adaptor 200 are fixed to each other. Specifically, a contact surface "a" of the first catching portion 120 contacts on a contact surface "b" of the second catching portion 220. Therefore, due to the contact of the contact surface "a" of the first catching portion 120 with the contact surface "b" of the second catching portion 220, the seating part 100 can limit the upward movement of the adaptor 200.

Here, the contact surface "a" of the first catching portion 120 and the contact surface "b" of the second catching portion 220 may be formed in parallel with each other. Preferably, the contact surface "a" of the first catching portion 120 and the contact surface "b" of the second catching portion 220 may be formed in parallel with the horizon.

In the coupling of the seating part 100 and the adaptor 200, the pressing portion 235 is located on the catching portion 135 such that the catching portion 135 is not lifted up. Therefore, the pressing portion 235 can prevent the seating part 100 and the guide spring 30 shown in FIG. 2 from being separated from each other.

The seating part 100 and the adaptor 200, which have been coupled to each other, may be separated from each other as follows. After the switch 223 of the second catching portion 220 is separated by pushing or pulling the switch 223 in the direction of the other end of the adaptor 200, the first and second catching portions 120 and 220 are first separated by lifting up the other end of the adaptor 200. Then, the first and second fitting portions 110 and 210 is separated by pushing or pulling backward the adaptor 200, so that the seating part 100 and the adaptor 200 are completely separated from each other.

As such, when the wiping is performed by the flat wiper blade assembly 1 according to the first embodiment, the coupling structure prevents the seating part 100 from being separated from the wiper blade 2.

Further, in the coupling of the seating part 100 and the adaptor 200, the coupling structure makes it easier to attach and remove the seating part 100 and the adaptor 200 to and from each other.

Figure 8:
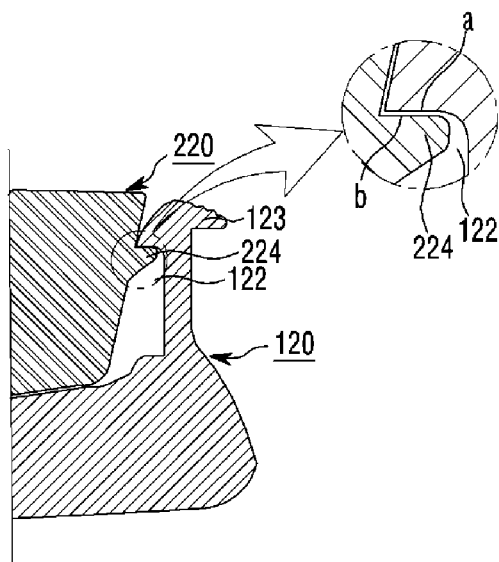
FIG. 8 is a cross sectional view for describing another examples of the first catching portion and the second catching portion.

FIG. 8 is a cross sectional view for describing another examples of the first catching portion and the second catching portion.

Referring to FIGS. 7c and 8, a switch 123 may be formed on the first catching portion 120. Specifically, the switch 123 is formed on the first catching portion 120 and is pushed or pulled toward the rear of the seating part 100, so that the first catching portion 120 is separated from the second catching portion 220.

Figure 9:
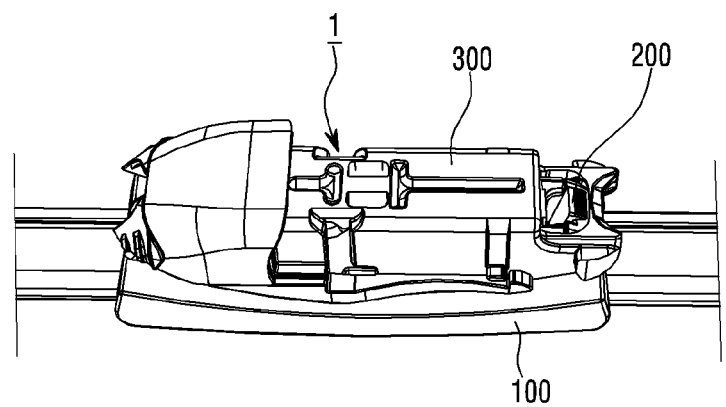
FIG. 9 is a perspective view showing that the flat wiper blade, the adaptor and the connector which are shown in FIG. 4 have been coupled to each other.

FIG. 9 is a perspective view showing that the flat wiper blade, the adaptor and the connector which are shown in FIG. 4 have been coupled to each other.

After the seating part 100 and the adaptor 200 are coupled to each other, the connector 300 may be coupled to the adaptor 200. There is no limit to how the connector 300 is coupled to the adaptor 200. Since it can be considered that the coupling of the connector 300 and the adaptor 200 is performed by publicly known arts, a detailed description thereof will be omitted.

The wiper arm may be coupled to the flat wiper blade assembly 1 combined with the flat wiper blade 2, the adaptor 200 and the connector 300. Here, since the wiper arm is located on the second catching portion 220 of the adaptor 200, the second catching portion 220 is not exposed after the wiper arm is coupled to the flat wiper blade assembly 1. Therefore, after the wiper arm is coupled to the flat wiper blade assembly 1, the seating part 100 and the adaptor 200 are not separated from each other by external operations.

Second Embodiment

Hereafter, a flat wiper blade assembly 1' according to a second embodiment will be described. Prior to the description of the flat wiper blade assembly 1' according to the second embodiment, the configuration of the flat wiper blade assembly 1' according to the second embodiment is almost the same as that of the flat wiper blade assembly 1 according to the first embodiment. Therefore, the detailed description of the flat wiper blade 2 will be omitted.

Figure 10:
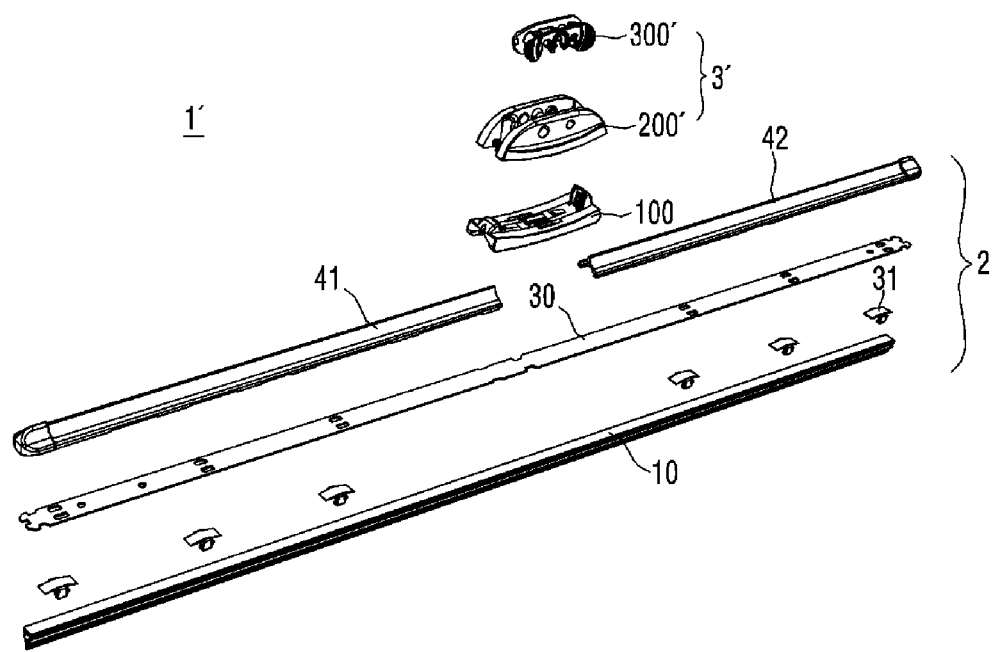
FIG. 10 is an exploded perspective view showing that a flat wiper blade assembly according to a second embodiment.

FIG. 10 is an exploded perspective view showing that the flat wiper blade assembly according to the second embodiment.

Referring to FIG. 10, the flat wiper blade assembly 1' according to the second embodiment includes the flat wiper blade 2 and an adaptor part 3' which is assembled to the central portion of the flat wiper blade 2 so as to connect the flat wiper blade 2 with the wiper arm (not shown).

The adaptor part 3' includes an adaptor 200' which is coupled to the seating part 100, and a connector 300' which is coupled to the adaptor 200' and couples the wiper arm to the flat wiper blade 2.

Figure 11:
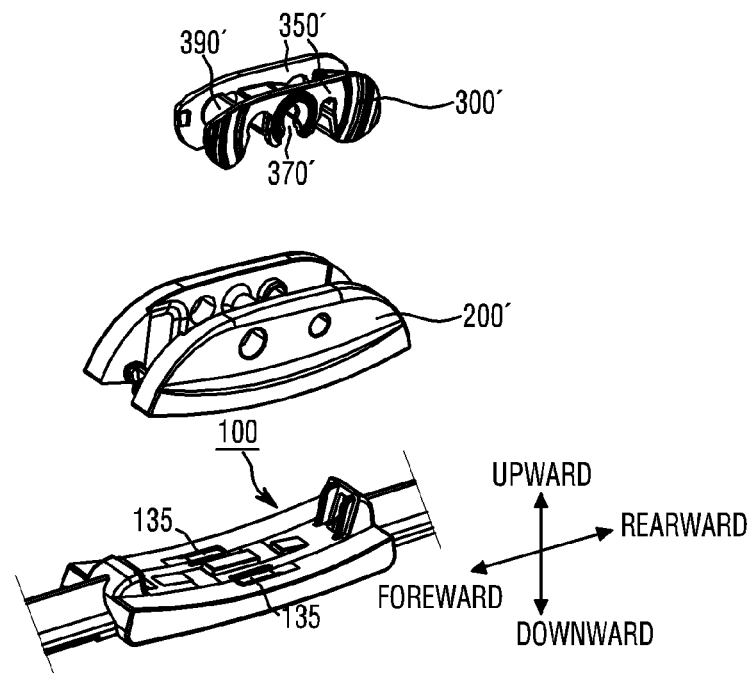
FIG. 11 shows that a flat wiper blade, an adaptor and a connector of the flat wiper blade assembly according to the second embodiment have been disassembled.

FIG. 11 shows that the flat wiper blade, the adaptor and the connector of the flat wiper blade assembly according to the second embodiment have been disassembled. FIGS. 12a to 12d are perspective views of the adaptor shown in FIG. 11.

Figure 12A:
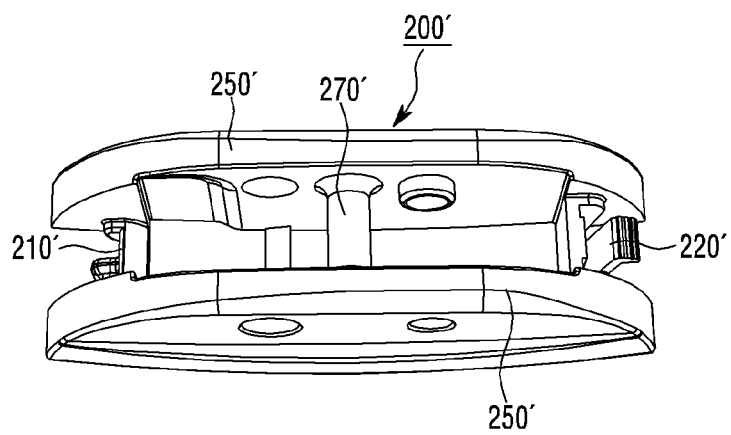
FIGS. 12a to 12d are perspective views of the adaptor shown in FIG. 11.
Figure 12B:
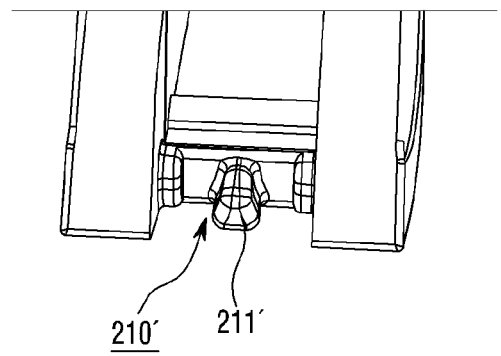
Figure 12C:
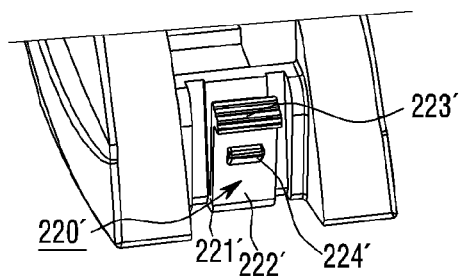
Figure 12D:
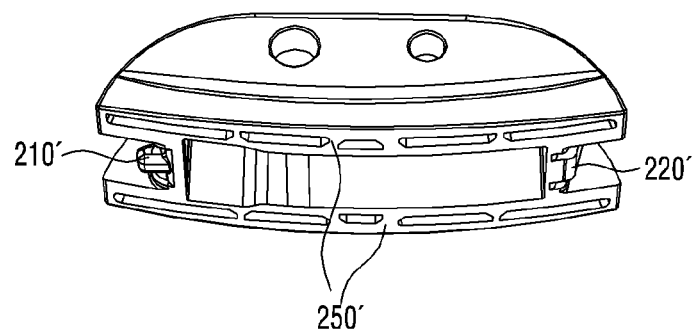

Specifically, FIG. 12a is an overall perspective view showing the top surface of the adaptor 200'. FIG. 12b is a partial perspective view showing one end of the adaptor 200'. FIG. 12c is partial perspective view showing the other end of the adaptor 200'. FIG. 12d is an overall perspective view showing the bottom surface of the adaptor 200'.

Referring to FIGS. 11 and 12a to 12d, like the first embodiment, the adaptor 200' includes a second fitting portion 210' and a second catching portion 220'.

A pair of outer side plates 250' may be formed separately from each other at a predetermined interval and protrude vertically upward from the top of the adaptor 200'. The central portions of the outer side plates 250' are connected by a hinge shaft 270'. The hinge shaft 270' is inserted into a hinge recess 370' of the connector 300'.

In the coupling of the seating part 100 and the adaptor 200', the outer side plate 250' is located on the catching portion 135 such that the catching portion 135 is not lifted up. Therefore, the outer side plate 250' can prevent the seating part 100 and the guide spring from being separated from each other.

Meanwhile, referring to FIG. 11, the connector 300' is inserted between the outer side plates 250' of the adaptor 200'. The connector 300' may include a pair of inner side plates 350' contacting with the outer side plate 250', the hinge recess 370' formed in the central portion of the inner side plate 350', and a curved portion 390' formed in a portion of a connection portion which surrounds the hinge recess 370' and connects the outer side plates 250'. The wiper arm with a "U" shaped clip, that is, the wiper arm having a straight portion and a curved portion at the distal end thereof which extends from the straight portion is selectively caught by the curved portion 390'.

The connector 300' may be used for the wiper arm with a "U" shaped clip type having a catching structure, a bayonet type fitted as a plug type, a pin type forming a protrusion in a side portion and taking a fitting structure by the protrusion, a side hole type, and the like, performing a fitting coupling in the side portion of the wiper apparatus.

The adaptor 200' according to the second embodiment is coupled to the seating part 100 in the same manner as that of the above-described first embodiment. That is, the second fitting portion 210' of the adaptor 200' is inserted into the first fitting portion 110 of the seating part 100, and the second catching portion 220' of the adaptor 200' is coupled to the first catching portion 120 of the seating part 100.

The adaptor 200' according to the second embodiment is separated from the seating part 100 in the same manner as that of the above-described first embodiment. After a switch 223' of the second catching portion 220' is separated by pushing or pulling the switch 223' in the direction of the other end of the adaptor 200', the first and second catching portions 120 and 220' are first separated by lifting up the other end of the adaptor 200'. Then, the first and second fitting portions 110 and 210' is separated by pushing or pulling backward the adaptor 200', so that the seating part 100 and the adaptor 200' are completely separated from each other. Since the method for coupling and separating the seating part 100 to and from the adaptor 200' is the same as that of the first embodiment, detailed descriptions thereof will be omitted.

Figure 13:
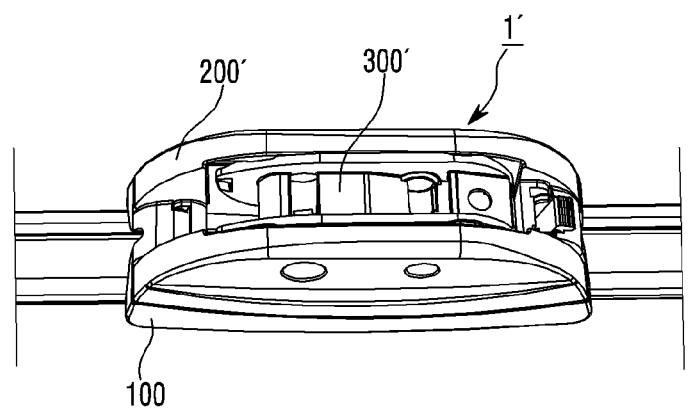
FIG. 13 is a perspective view showing that the flat wiper blade, the adaptor and the connector which are shown in FIG. 11 have been coupled to each other.

FIG. 13 is a perspective view showing that the flat wiper blade, the adaptor and the connector which are shown in FIG. 11 have been coupled to each other.

After the seating part 100 is coupled to the adaptor 200', the connector 300' and the adaptor 200' may be coupled to each other. There is no limit to how the connector 300' is coupled to the adaptor 200'. Since it can be considered that the coupling of the connector 300 and the adaptor 200 is performed by publicly known arts, a detailed description thereof will be omitted.

The wiper arm may be coupled to the flat wiper blade assembly 1' combined with the flat wiper blade 2, the adaptor 200' and the connector 300'. Here, since the wiper arm is located on the second catching portion 220' of the adaptor 200', the second catching portion 220' is not exposed after the wiper arm is coupled to the flat wiper blade assembly 1'. Therefore, after the wiper arm is coupled to the flat wiper blade assembly 1', the seating part 100 and the adaptor 200' are not separated from each other by external operations.

As such, in the flat wiper blade assemblies 1 and 1' according to the first and second embodiments, the seating part 100 and the adaptor 200 and 200' may be fixed to each other by the catching portion and may be easily separated from each other by the operation of the switches 123 and 223.

Also, since the flat wiper blade assemblies 1 and 1' according to the first and second embodiments use the same seating part 100 and have the same coupling method, the adaptor 200 and 200' can be coupled to the one seating part 100.

Further, in the flat wiper blade assemblies 1 and 1' according to the first and second embodiments, since the seating part 100 and the adaptor 200 and 200' is coupled to each other by using the fitting portion and the catching portion, the structures of the flat wiper blade assemblies 1 and 1' are simple, so that it is possible to simplify the manufacturing process and to reduce the manufacturing cost. Also, since the seating part 100 and the adaptor 200 and 200' is more simply coupled to each other, the seating part 100 and the adaptor 200 and 200' is easily attachable to and removable from each other.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the embodiments of the present invention were described above, these are just examples and do not limit the present invention. Further, the present invention may be changed and modified in various ways, without departing from the essential features of the present invention, by those skilled in the art. That is, the components described in detail in the embodiments of the present invention may be modified. Further, differences due to the modification and application should be construed as being included in the scope and spirit of the present invention, which is described in the accompanying claims.

What is claimed is:

1. A flat wiper blade assembly comprising:
   a wiper strip which wipes a wiping surface;
   a guide spring which supports the wiper strip;
   a first spoiler and a second spoiler which are coupled to the guide spring;
   a seating part which is coupled to the guide spring in an attachable and removable manner; and
   an adaptor which is coupled to the seating part,
      wherein the seating part comprises a first fitting portion formed on one end thereof and a first catching portion formed on the other end thereof,
      wherein the adaptor comprises a second fitting portion which is formed on one end thereof and coupled to the first fitting portion and comprises a second catching portion which is formed on the other end thereof and coupled to the first catching portion,
      wherein the guide spring comprises catching recesses,
      wherein the seating part further comprises additional catching portions which are formed separately from each other and are caught by the catching recesses of the guide spring,
      wherein the adaptor comprises a pair of pressing portions formed separately from each other on both sides of the adaptor,
      wherein the pressing portions are located on the additional catching portions such that the additional catching portions are not lifted up, and
      wherein the second catching portion includes,
         an extension part which extends toward the rear of the adaptor,
         a body which is formed on the end of the extension part and extends upward,
         a switch which is formed at the end of the body and which protrudes toward the rear of the adaptor, and
         a catching protrusion which protrudes from the body toward the rear of the adaptor, and
      wherein at least a portion of the first catching portion is positioned between the switch and the catching protrusion when the adaptor is coupled to the seating part.

2. The flat wiper blade assembly of claim 1, wherein the second catching portion further comprises a contact surface, and wherein the first catching portion comprises another contact surface located on the contact surface.

3. The flat wiper blade assembly of claim 2, wherein the first catching portion and the second catching portion are elastically caught and coupled to each other.

4. The flat wiper blade assembly of claim 1, wherein the first fitting portion comprises a fitting recess, wherein the second fitting portion comprises a fitting protrusion, and wherein the fitting protrusion is inserted into the fitting recess.

5. The flat wiper blade assembly of claim 1, wherein the first fitting portion comprises a fitting protrusion, wherein the second fitting portion comprises a fitting recess, and wherein the fitting protrusion is inserted into the fitting recess.

\* \* \* \* \*